United States Patent
Bin Redhwan et al.

(10) Patent No.: US 11,595,937 B2
(45) Date of Patent: Feb. 28, 2023

(54) SYSTEMS AND METHODS FOR EFFICIENT DRONE DETECTION

(71) Applicant: Telefonaktiebolaget LM Ericsson (publ), Stockholm (SE)

(72) Inventors: Sakib Bin Redhwan, Linköping (SE); Henrik Rydén, Solna (SE); Zhenhua Zou, Solna (SE); Mirsad Cirkic, Linköping (SE); Xingqin Lin, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 16/970,469

(22) PCT Filed: Mar. 7, 2019

(86) PCT No.: PCT/SE2019/050202
§ 371 (c)(1),
(2) Date: Aug. 17, 2020

(87) PCT Pub. No.: WO2019/172832
PCT Pub. Date: Sep. 12, 2019

(65) Prior Publication Data
US 2021/0120521 A1   Apr. 22, 2021

Related U.S. Application Data

(60) Provisional application No. 62/640,930, filed on Mar. 9, 2018.

(51) Int. Cl.
*H04W 64/00* (2009.01)
*H04W 36/00* (2009.01)
*H04B 7/185* (2006.01)

(52) U.S. Cl.
CPC ...... *H04W 64/006* (2013.01); *H04B 7/18506* (2013.01); *H04W 36/0058* (2018.08)

(58) Field of Classification Search
CPC ....... H04W 4/021; H04W 12/08; H04W 4/02; H04W 4/029; H04W 64/006;
(Continued)

(56) References Cited

U.S. PATENT DOCUMENTS

| | | | |
|---|---|---|---|
| 2017/0092138 A1* | 3/2017 | Trundle | G08B 25/14 |
| 2017/0355457 A1* | 12/2017 | Terry | G08G 5/0034 |

(Continued)

FOREIGN PATENT DOCUMENTS

AU   2016300342 A1   2/2018

OTHER PUBLICATIONS

PCT International Search Report and Written Opinion dated May 29, 2019 for International Application PCT/SE2019/050202, 11 pages.

(Continued)

*Primary Examiner* — Kwasi Karikari
(74) *Attorney, Agent, or Firm* — Sage Patent Group

(57) ABSTRACT

Systems and methods for providing unlicensed drone User Equipment (UE) detection in a cellular communications network are disclosed. In this regard, embodiments of a method of operation of a server for providing unlicensed drone UE detection in a cellular communications network are disclosed. In some embodiments, the method includes receiving, from a network node, a measurement report for a UE and predicting that the UE is an unlicensed drone UE based on the measurement report for the UE. The method further includes taking one or more actions upon predicting that the UE is an unlicensed drone UE. In this manner, an efficient unlicensed drone detection mechanism is provided.

19 Claims, 15 Drawing Sheets

(58) Field of Classification Search
CPC ..... H04W 12/03; H04W 12/06; H04W 48/02; H04W 48/04; H04W 4/027; H04W 4/42; H04W 4/44; H04W 4/50; H04W 84/06; H04W 84/18; H04W 12/082; H04W 12/10; H04W 12/121; H04W 12/37; H04W 12/64; H04W 12/80; H04W 16/14; H04W 24/04; H04W 24/10; H04W 4/024; H04W 60/06; H04W 76/32
See application file for complete search history.

(56) References Cited

U.S. PATENT DOCUMENTS

| | | | |
|---|---|---|---|
| 2018/0039838 A1* | 2/2018 | Chan | B64C 39/02 |
| 2018/0222582 A1* | 8/2018 | Ohata | G08B 25/10 |

OTHER PUBLICATIONS

Huawei et al., 3GPP TSG RAN WG2 Meeting #98 R2-1705000, "Identification of Air-Borne Drones", Hangzhou China, May 15-19, 2017, 3 pages.

Qualcomm Inc., 3GPP TSG RAN WG2 Meeting #98 R2-1704156, "Identification of Aerial Vehicles", Hangzhou China; May 15-19, 2017, 5 pages.

Qualcomm Inc., 3GPP TSG RAN WG2 Meeting #99 R2-1708238, "Identification and Certification of Aerial Vehicles", Berlin Germany, Aug. 21-25, 2017, 6 pages.

Lenovo et al., 3GPP TSG RAN WG2 Meeting #100 R2-1712945, "Consideration for Identification Issues for Drone UE", Reno USA, Nov. 27-Dec. 1, 2017, 3 pages.

Ericsson, 3GPP TSG RAN Meeting #75 RP-170779, "New SID on Enhanced Support for Aerial Vehicles", Dubrovnik Croatia, Mar. 6-9, 2017, 4 pages.

Ericsson, 3GPP TSG RAN Meeting #78 RP-172826, "New WID on Enhanced LTE Support for Aerial Vehicles", Lisbon Portugal; Dec. 18-21, 2017; 4 pages.

3GPP; Technical Specification Group Radio Access Network, "Study on Enhanced LTE Support for Aerial Vehicles (Release 15)", 3GPP TR 36.777 V15.0.0 (Dec. 2017); Valbonne, France, 142 pages.

European Office Action for European Patent Application No. 19712860.6 dated Apr. 29, 2022, 9 pages.

* cited by examiner

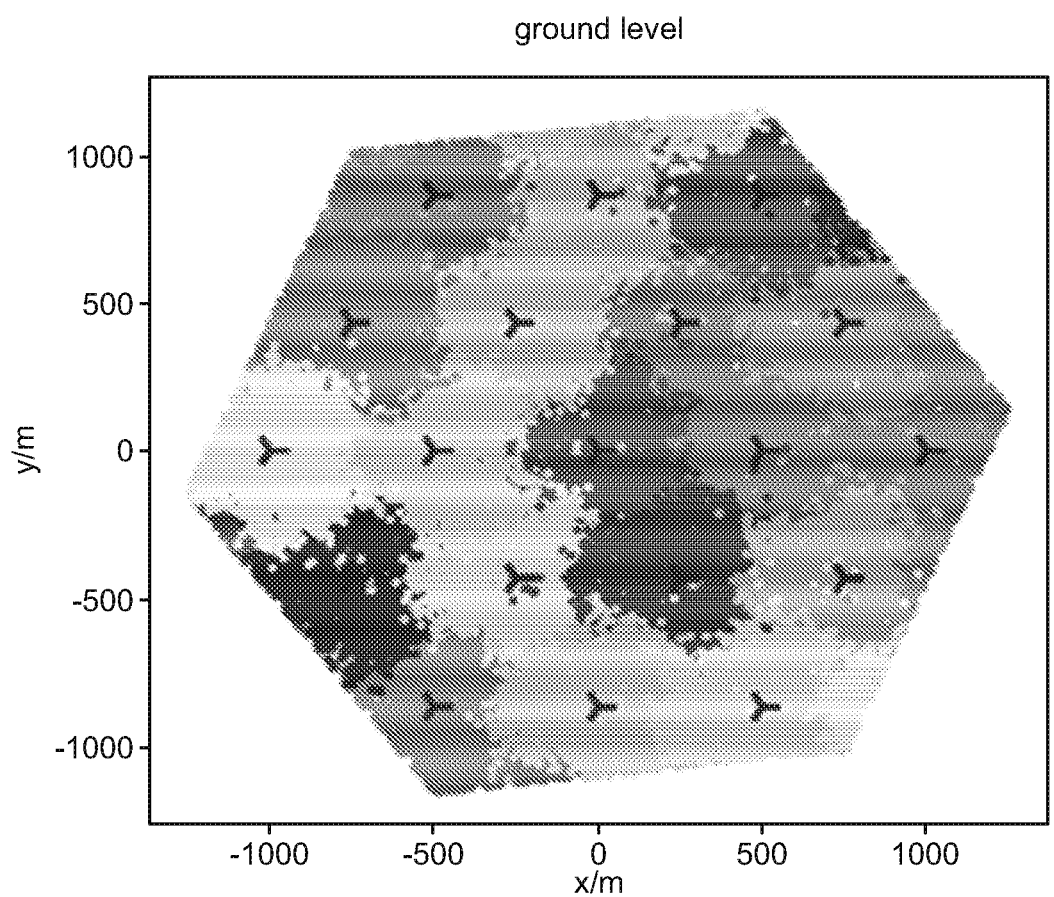
*FIG. 2-A*
*map showing the best serving cell as seen by UEs at ground level*

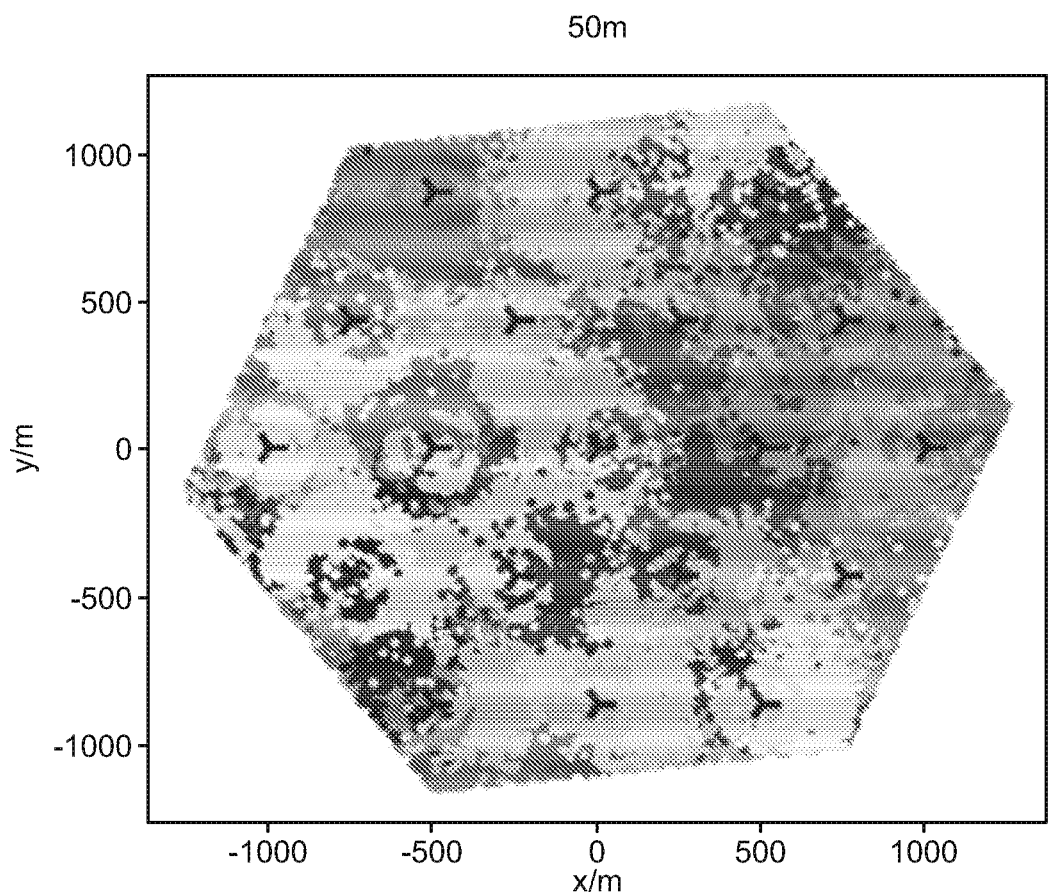
FIG. 2-B
map showing the best serving cell as seen by aerial UEs at 50m

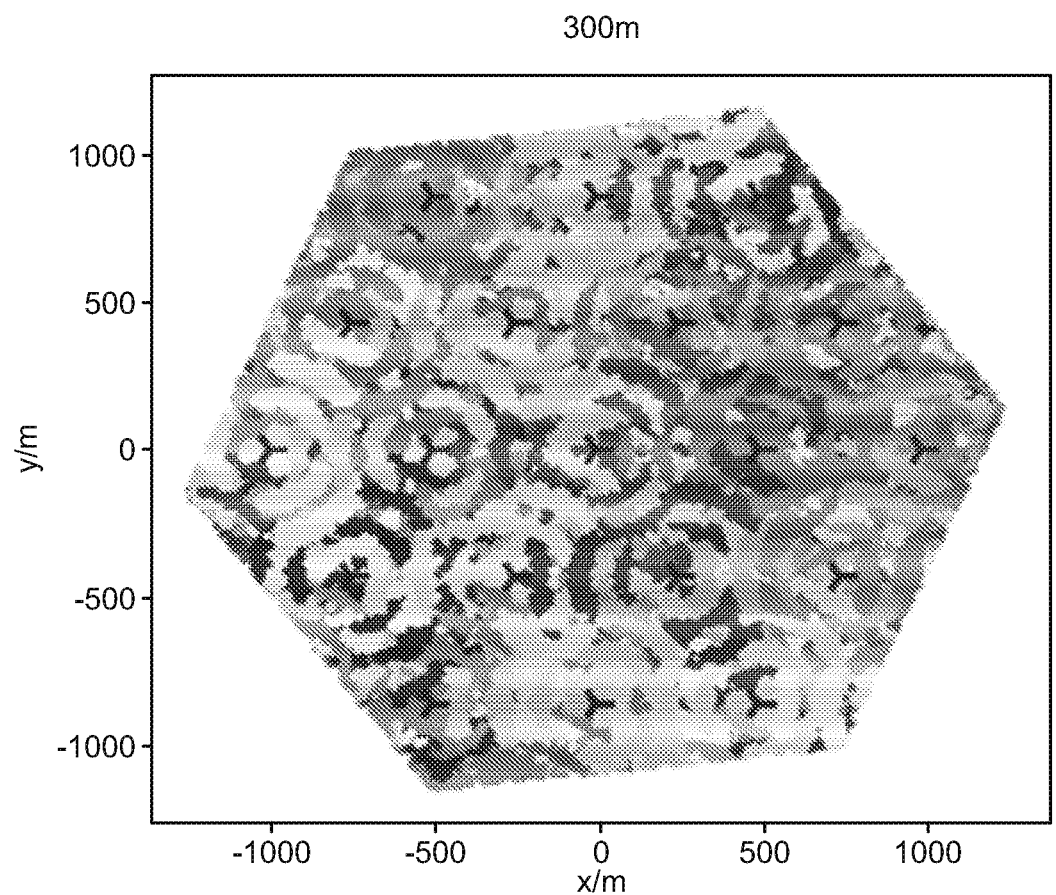
FIG. 2-C
map showing the best serving cell as seen by aerial UEs at 300m

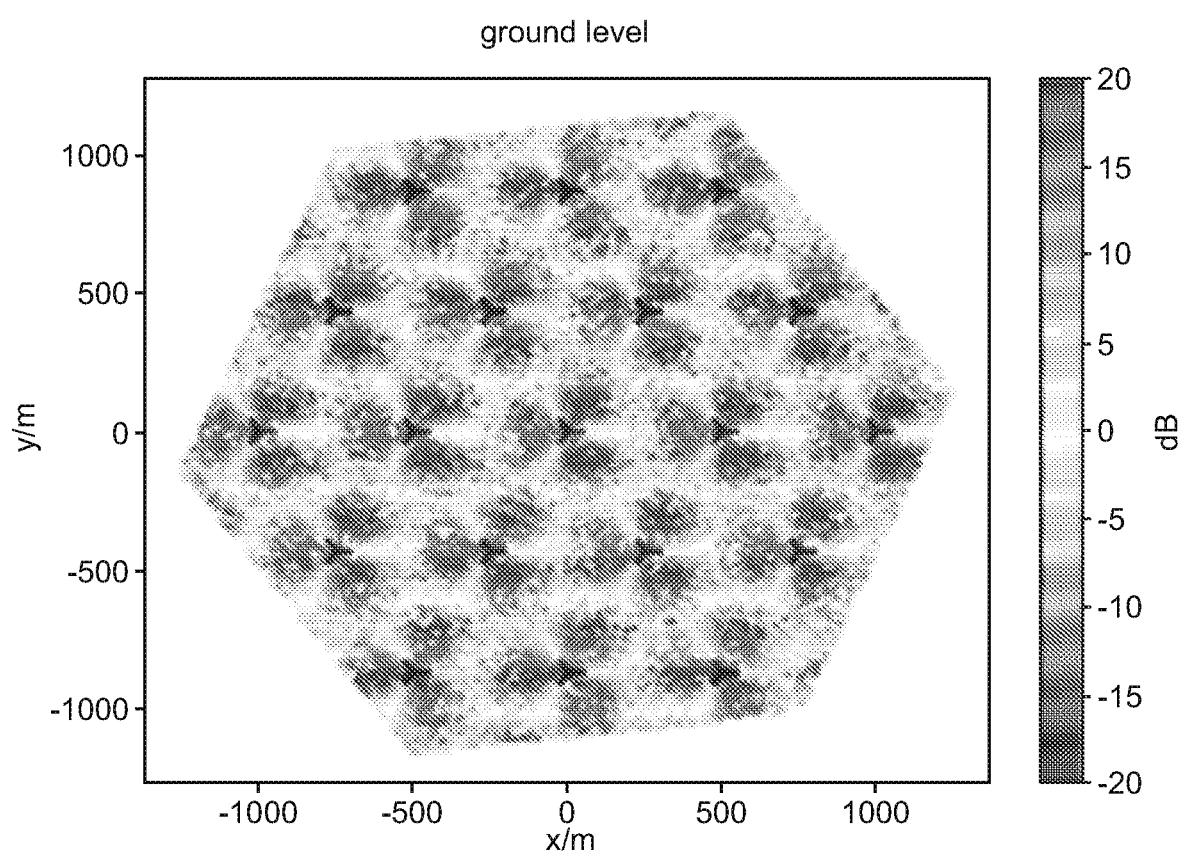
*FIG. 3-A*
*map showing the geometry SIR at ground level*

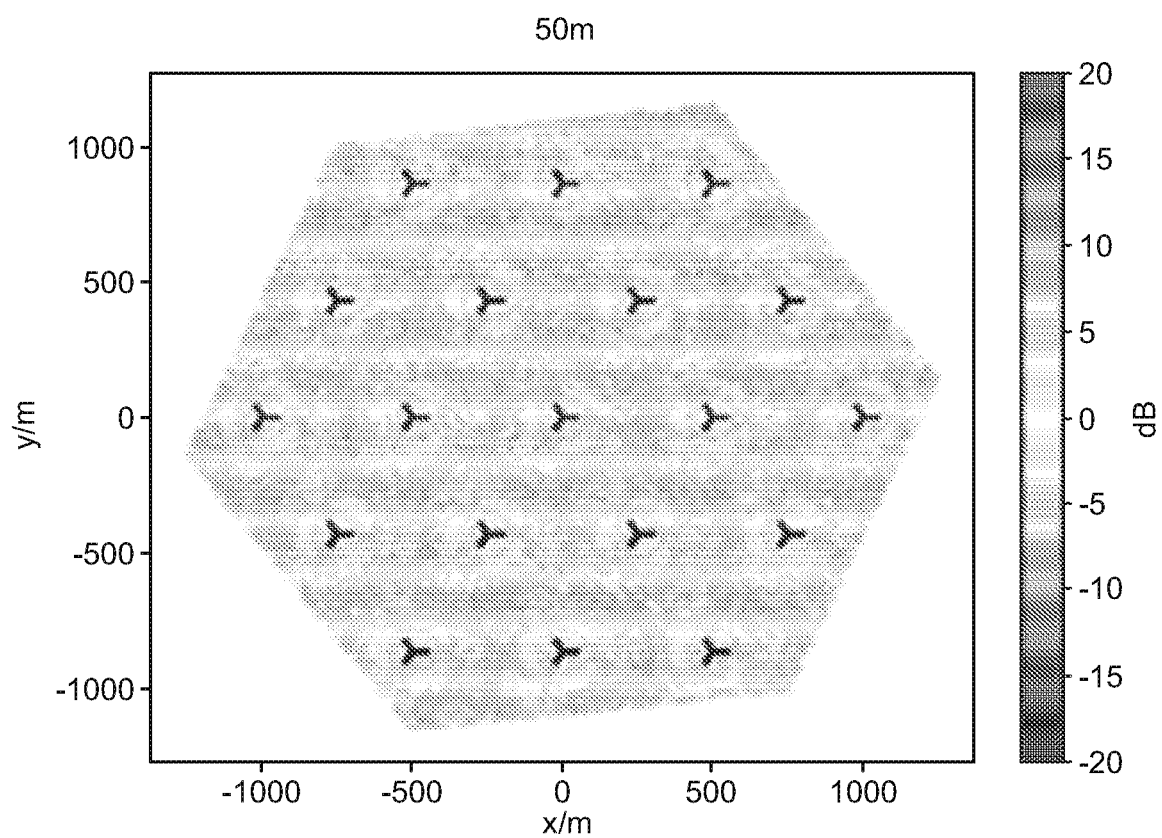
*FIG. 3-B*
*map showing the geometry SIR at 50m*

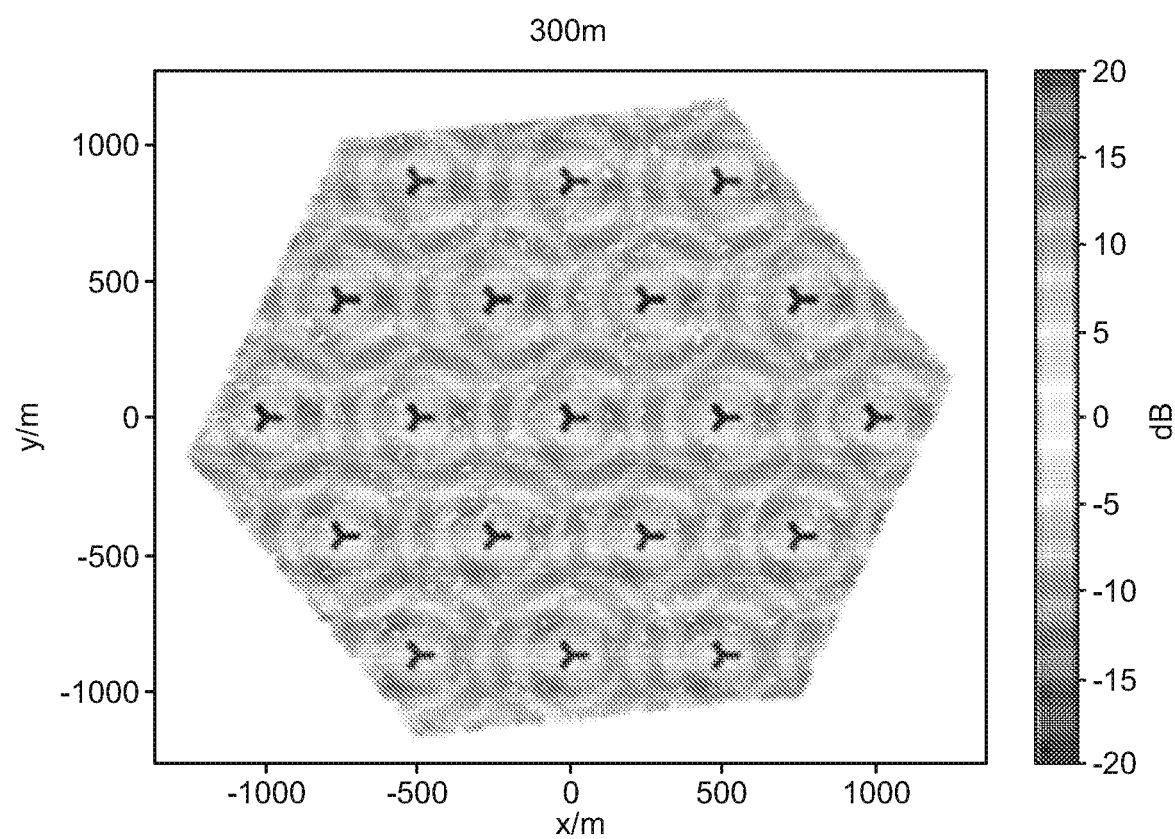
*FIG. 3-C*
*map showing the geometry SIR at 300m*

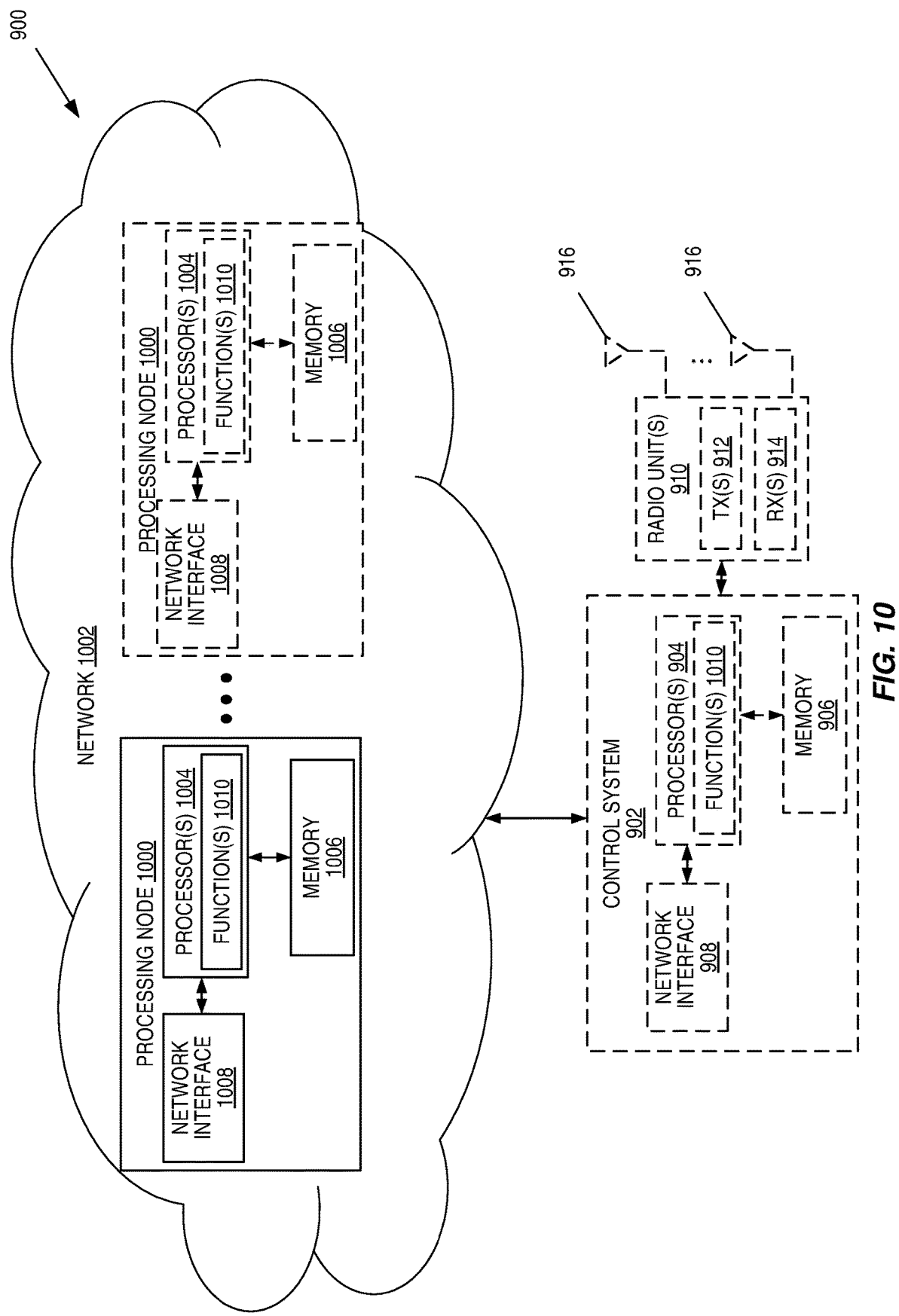

SYSTEMS AND METHODS FOR EFFICIENT DRONE DETECTION

CROSS-REFERENCE TO RELATED APPLICATIONS

This application is a 35 U.S.C. § 371 national stage application for International Application No. PCT/SE2019/050202, entitled "SYSTEMS AND METHODS FOR EFFICIENT DRONE DETECTION", filed on Mar. 7, 2019, which claims the priority to U.S. provisional patent application Ser. No. 62/640,930, filed Mar. 9, 2018, the disclosure and contents of which are hereby incorporated herein by reference in their entireties.

TECHNICAL FIELD

The present disclosure relates to detection of unlicensed, or rogue, drone User Equipments (UE) in a cellular communications network.

BACKGROUND

In Third Generation Partnership Project (3GPP) Meeting RAN #75, the study item on enhanced support for aerial vehicles was approved [1]. The objective of the study is to investigate the ability for aerial vehicles to be served using Long Term Evolution (LTE) network deployments with base station antennas targeting terrestrial coverage, supporting Release 14 functionality. In the System Information (SI), two objectives are listed related to inference issues using LTE network and one objective related to handovers as shown below:

---
Identify potential enhancements to LTE so that it is better suited to provide connectivity and positioning services to drones in the identified deployment scenarios. The study should consider the following aspects:
Interference mitigation solutions for improving system-level performance [RAN1]
Solutions to detect whether UL signal from an air-borne UE increases interference in multiple neighbor cells [RAN1, RAN2]
. . .
Handover: Identify if enhancements in terms of cell selection and handover efficiency as well as robustness in handover signaling can be achieved. [RAN2, RAN1]

---

Radio Access Network (RAN) Work Group 1 (WG1) and Work Group 2 (WG2) studied features and techniques extensively to meet the objectives, and various performance enhancing solutions were identified and evaluated. To serve aerial User Equipments (UEs) more efficiently and limit the impact on terrestrial UEs, solutions based on specification enhancements are beneficial. The findings during the study item phase are summarized in Technical Report (TR) 36.777 [2]. A follow-up work item [3] was approved in RAN #78, and in particular the following will be specified:

---
Specify enhancements to support improved mobility performance and interference detection in the following areas [RAN2]:
Enhancements to existing measurement reporting mechanisms such as definition of new events, enhanced triggering conditions, mechanisms to control the amount of measurement reporting.
Specify enhancements to support indication of UE's airborne status [RAN2].

---

As described in [2], an air-borne UE may experience radio propagation characteristics that are likely to be different from those experienced by a UE on the ground. As long as an aerial vehicle is flying at a low altitude, relative to the base station antenna height, it behaves like a conventional UE. However, once an aerial vehicle is flying well above the base station antenna height, the uplink signal from the aerial vehicle becomes more visible to multiple cells due to line-of-sight propagation conditions. The uplink signal from an aerial vehicle increases interference in the neighbour cells and the increased interference gives a negative impact to the UE on the ground, e.g. smartphone, Internet of Things (IoT) device, etc. Similarly, these line-of-sight conditions to multiple cells incur higher downlink interference to the aerial UE.

Further, as the base station antennas are down tilted, on the ground, or below the base station antenna height, the UE is likely served by the main lobe of the antennas. However, when the drone UE is flying above boresight, the UE is likely served by the side or back lobes of the antennas, which have reduced antenna gains compared to the antenna gain of the main lobe. FIG. 1 depicts this situation.

The maps in FIGS. 2-A through 2-C show that the coverage area of an enhanced or evolved Node B (eNB) in the sky may be fragmented into several discontinuous areas, while the coverage area of an eNB on the ground is usually an approximate closed set. Also, for a drone UE, a certain cell will appear as the best cell further away compared to terrestrial UEs. In this map, locations that are served by the same site are labeled by the same shading, assuming that UEs connect to their corresponding strongest cells. FIGS. 2-A through 2-C correspond to the situation at 0 meters (m), 50 m, and 300 m above ground, respectively.

In FIGS. 3-A through 3-C, the geometry Signal to Interference Ratio (SIR) at different heights is shown. As expected, the higher the UE, the lower the quality of the signal becomes.

Machine learning can be used to find a predictive function for a given dataset; the dataset is typically a mapping between a given input to an output. The predictive function (or mapping function) is generated in a training phase, where the training phase assumes knowledge of both the input and output. The test phase comprises predicting the output for a given input. Applications of machine learning are for example curve fitting, facial recognition, and spam filter. FIG. 4 shows an example of one type of machine learning, namely classification, where the task is to train a predictive function that separates the two classes (circle and cross class). In FIG. 4(a), features 1 and 2 provide low separation of the output class, hence leading to a worse prediction performance in comparison with FIG. 4(b), where features 3 and 4 are used to enable a better separation and classifying performance. In general, the performance of the machine learner is proportional to the correlation between the input and the output, and one key problem in machine learning is to find/create good features.

Drones that provide a video feed to their flight controller over the mobile network for extended flying range implicate high uplink streaming traffic load for the network. Such drones are appearing more frequently due the application opportunities provided by the extended range of mobile broadband. Based on the traffic characteristics and the control characteristics, the mobile operators are likely to put the drone UEs in a separate service class associating different policies on them. Thus, it is important that mobile networks can identify if a UE is a drone UE or a regular ground UE to provide the right service optimization for drone UEs while protecting the performance of ground UEs from the potential interfering signals from drone UEs.

For legitimate drone UEs, standard mechanisms can be enforced so that these drone UEs can be recognized by the networks. For example, it can be required that a drone operator should acquire a Subscriber Identity Module (SIM) card that is designed or registered for drone use if the drone would like to use a cellular connection, i.e., the drone UE should have the right subscription. Another method could be to introduce drone-related radio access capacities in the standards such as: a) direct flying status indication mechanisms so that drone UEs can inform the network when they are in the flying mode; and b) measurement reporting enhancements so that the network can identify whether the drone UE is flying and/or causing excessive interferences. Note that this second method of drone-related radio access capacities cannot be used by legacy UEs.

In the work item, the above two methods will be standardized and, for a flying UE to be identified as a legitimate drone UE, it needs to both support drone-related radio access capabilities and have a correct subscription.

A "rogue" drone UE is any flying UE that either is not registered with the network or does not support drone-related radio access capabilities. For example, there are some cases where a legacy UE is attached to a drone and being flown over the network. The flying terrestrial UE on the drone may generate excessive interference to the network and may not be allowed by regulations in some regions. This phenomenon is being observed in the field and has drawn much attention from mobile operators. It is critical to identify these unlicensed drones from both operator and security perspectives. Such a need has also been identified in the 3GPP study/work item on enhanced LTE support for aerial vehicles [1-3].

One challenging problem here is that the legacy UEs will not have new features introduced in the work item to help the network to identify the flying status. The network must rely on existing measurement report mechanisms to identify if a legacy UE is flying or not and identify it as a "rogue" drone.

SUMMARY

Systems and methods for providing unlicensed drone User Equipment (UE) detection in a cellular communications network are disclosed. In this regard, embodiments of a method of operation of a server for providing unlicensed drone UE detection in a cellular communications network are disclosed. In some embodiments, the method comprises receiving, from a network node, a measurement report for a UE and predicting that the UE is an unlicensed drone UE based on the measurement report for the UE. The method further comprises taking one or more actions upon predicting that the UE is an unlicensed drone UE. In this manner, an efficient unlicensed drone detection mechanism is provided.

In some embodiments, the measurement report is a measurement report for a UE session of the UE.

In some embodiments, predicting that the UE is an unlicensed drone UE based on the measurement report for the UE comprises predicting that the UE is an unlicensed drone UE based on the measurement report for the UE and one or more prior measurement reports received by the server for the UE. Further, in some embodiments, the measurement report for the UE is a measurement report for a UE session of the UE, and the one or more prior measurement reports are one or more prior measurement reports received by the server for one or more prior UE sessions of the UE. In some embodiments, the measurement report and the one or more prior measurement reports are for two or more different cells. In some embodiments, at least one of the one or more prior measurement reports is received by the server from another network node. In some embodiments, predicting that the UE is an unlicensed drone UE comprises predicting that the UE is an unlicensed drone UE based on a number of times that the UE has been predicted, in the measurement report and the one or more prior measurement reports, as being an unlicensed drone UE and/or a confidence level of the predictions in the measurement report and the one or more prior measurement reports that the UE is an unlicensed drone UE.

In some embodiments, the measurement report comprises information that indicates that the network node has predicted that the UE is an unlicensed drone UE and/or a confidence level for the prediction that the UE is an unlicensed drone UE.

In some embodiments, the measurement report comprises one or more measurements for the UE that can be used by the server when predicting that the UE is an unlicensed drone UE. In some embodiments, the one or more measurements comprise one or more Reference Signal Received Power (RSRP) measurements, one or more Reference Signal Received Quality (RSRQ) measurements, and/or one or more Received Signal Strength Indicator (RSSI) measurements.

In some embodiments, taking one or more actions comprises signaling, to another node, one or more actions to be taken with respect to the UE. In some embodiments, the other node is the network node from which the measurement report was received.

In some embodiments, the method further comprises, prior to receiving the measurement report from the network node, sending detection information to the network node, the detection information comprising a triggering condition for the measurement report. In some embodiments, the triggering condition is: when a probability of the UE being an unlicensed drone UE, as determined by the network node, is above a defined threshold; when a probability of the UE being an unlicensed drone UE, as determined by the network node, is above a defined threshold for at least N prediction instances; when a probability of the UE being an unlicensed drone UE, as determined by the network node, is above a defined threshold with a confidence that is above a defined confidence threshold; when the UE performs a handover to another network node; when the UE goes into an IDLE mode; or based on a timer. In some embodiments, the triggering condition is when a probability of the UE being an unlicensed drone UE, as determined by the network node, is above a defined threshold for at least N prediction instances, and N is greater than 1. In some embodiments, the triggering condition is when a probability of the UE being an unlicensed drone UE, as determined by the network node, is above a defined threshold for at least N prediction instances, and a value of N is comprised in the detection information. In some embodiments, the triggering condition is when a probability of the UE being an unlicensed drone UE, as determined by the network node, is above a defined threshold for at least N prediction instances, and N is based on drone detection capabilities of the network node. In some embodiments, the detection information further comprises an indication of a reporting format to be used by the network node for the measurement report.

In some embodiments, the method further comprises, prior to receiving the measurement report from the network node, requesting and receiving one or more drone detection capabilities of the network node. In some embodiments, the one or more drone detection capabilities of the network node comprise: whether the network node supports drone detection; a machine learning model used by the network node for drone detection; a prediction performance of a machine learning model used by the network node; information regarding a performance of the machine learning model used by the network node to detect unlicensed drones in prior sessions; one or more features used by the machine learning model used by the network node for drone detection; and/or a prediction periodicity of the machine learning model used by the network node to detect unlicensed drones.

Embodiments of a node for implementing a server for providing unlicensed drone UE detection in a cellular communications network are also disclosed. In some embodiments, in order to implement the server, the node is adapted to receive, from a network node, a measurement report for a UE; predict that the UE is an unlicensed drone UE based on the measurement report for the UE session; and take one or more actions upon predicting that the UE is an unlicensed drone UE.

In some other embodiments, a node for implementing a server for providing unlicensed drone UE detection in a cellular communications network comprises a network interface and processing circuitry associated with the network interface. The processing circuitry is operable to, in order to implement the server, cause the node to receive, from a network node, a measurement report for a UE; predict that the UE is an unlicensed drone UE based on the measurement report for the UE session; and take one or more actions upon predicting that the UE is an unlicensed drone UE.

Embodiments of a method of operation of a network node for providing unlicensed drone UE detection in a cellular communications network are also disclosed. In some embodiments, the method comprises sending, to a server, a measurement report for a UE, the measurement report comprising information that relates to whether the UE is an unlicensed drone UE.

In some embodiments, the method further comprises receiving, from the server, signaling that indicates that the UE is an unlicensed drone UE. In some other embodiments, the signaling comprises an indication of one or more actions to be taken with respect to the UE.

In some embodiments, the method further comprises, prior to sending the measurement report, performing an unlicensed drone detection procedure directed at the UE to thereby determine a prediction as to whether the UE is an unlicensed drone UE and/or a confidence level for the prediction that the UE is an unlicensed drone UE. The measurement report comprises information that indicates the prediction as to whether the UE is an unlicensed drone UE and/or information that indicates the confidence level for the prediction that the UE is an unlicensed drone UE.

In some embodiments, the measurement report comprises one or more measurements for the UE that relate to whether the UE is an unlicensed drone UE. In some embodiments, the one or more measurements comprise one or more RSRP measurements, one or more RSRQ measurements, and/or one or more RSSI measurements.

In some embodiments, the measurement report is a measurement report for a UE session of the UE.

In some embodiments, the method further comprises, prior to sending the measurement report to the server, receiving detection information from the server, the detection information comprising a triggering condition for the measurement report. In some embodiments, the triggering condition is: when a probability of the UE being an unlicensed drone UE, as determined by the network node, is above a defined threshold; when a probability of the UE being an unlicensed drone UE, as determined by the network node, is above a defined threshold for at least N prediction instances; when a probability of the UE being an unlicensed drone UE, as determined by the network node, is above a defined threshold with a confidence that is above a defined confidence threshold; when the UE performs a handover to another network node; when the UE goes into an IDLE mode; or based on a timer. In some embodiments, the triggering condition is when a probability of the UE being an unlicensed drone UE, as determined by the network node, is above a defined threshold for at least N prediction instances, and N is greater than 1. In some embodiments, the triggering condition is when a probability of the UE being an unlicensed drone UE, as determined by the network node, is above a defined threshold for at least N prediction instances, and a value of N is comprised in the detection information. In some embodiments, the triggering condition is when a probability of the UE being an unlicensed drone UE, as determined by the network node, is above a defined threshold for at least N prediction instances, and N is based on drone detection capabilities of the network node. In some embodiments, the detection information further comprises an indication of a reporting format to be used by the network node for the measurement report.

In some embodiments, the method further comprises determining whether the triggering condition is met. Sending the measurement report comprises sending the measurement report to the server upon determining that the triggering condition is met.

In some embodiments, the method further comprises, prior to sending the measurement report to the server, signaling one or more drone detection capabilities of the network node to the server. In some embodiments, the one or more drone detection capabilities of the network node comprise: whether the network node supports drone detection; a machine learning model used by the network node for drone detection; a prediction performance of a machine learning model used by the network node; information regarding a performance of the machine learning model used by the network node to detect unlicensed drones in prior sessions; one or more features used by the machine learning model used by the network node for drone detection; and/or a prediction periodicity of the machine learning model used by the network node to detect unlicensed drones.

Embodiments of a network node for providing unlicensed drone UE detection in a cellular communications network are also disclosed. In some embodiments, the network node is adapted to send, to a server, a measurement report for a UE, the measurement report comprising information that relates to whether the UE is an unlicensed drone UE.

In some other embodiments, a network node for providing unlicensed drone UE detection in a cellular communications network comprises a network interface and processing circuitry associated with the network interface. The processing circuitry is operable to cause the network node to send, to a server, a measurement report for a UE, the measurement report comprising information that relates to whether the UE is an unlicensed drone UE.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 2-A through 2-C are maps that show that the coverage area of an enhanced or evolved Node B (eNB) in the sky may be fragmented into several discontinuous areas, while the coverage area of an eNB on the ground is usually an approximate closed set;

FIGS. 3-A through 3-C are maps that show the geometry Signal to Interference Ratio (SIR) at different heights;

FIGS. 9 through 11 are block diagrams of example embodiments of a node (e.g., a node implementing a server or a network node)

DETAILED DESCRIPTION

Figure 1:
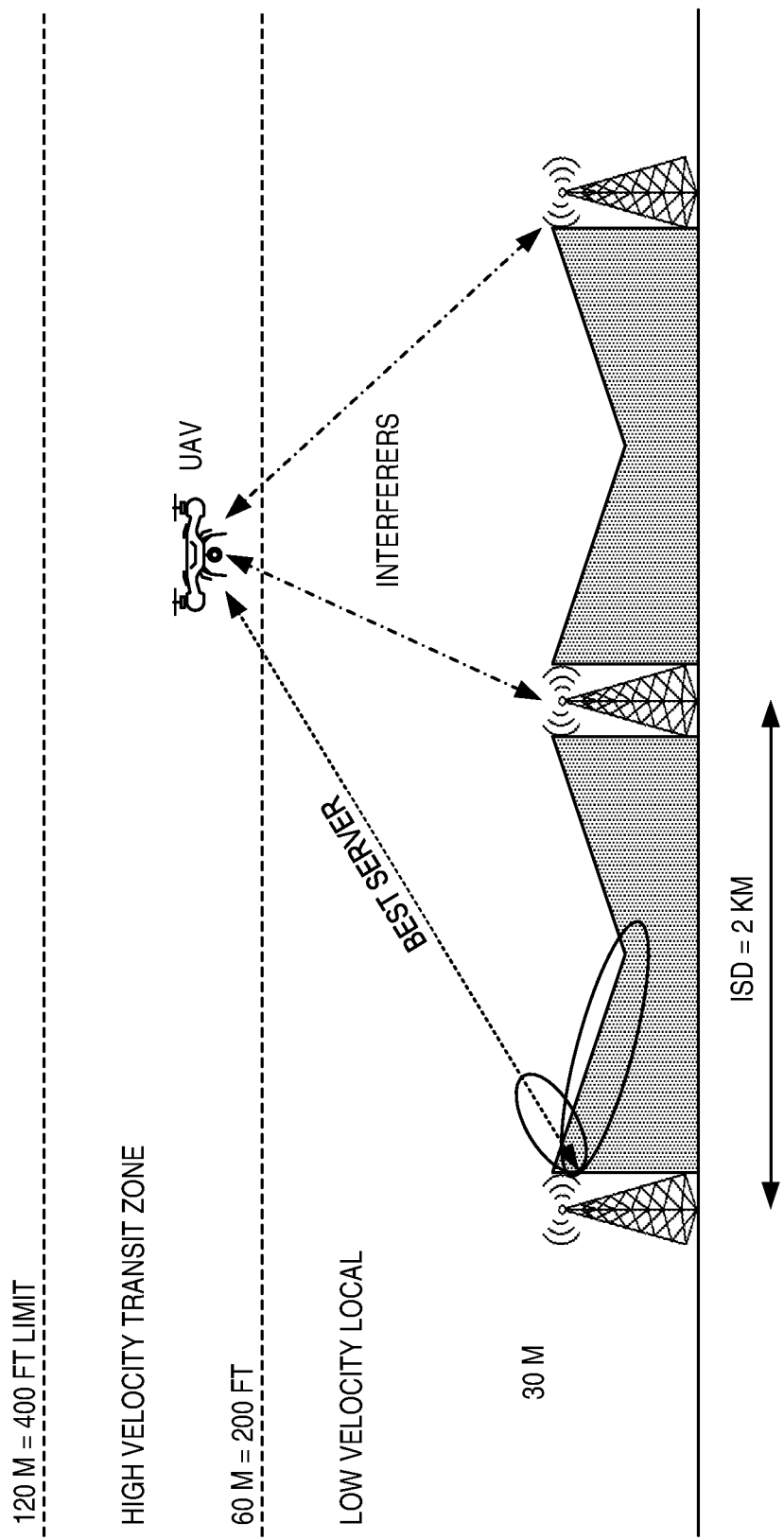
FIG. 1 depicts a situation in which a User Equipment (UE) that is located on the ground or below the height of base station antennas is likely to be served by the main lobe of the base station antennas, and a UE that is flying at a height above the boresight of the base station antennas is likely to be served by the side or back lobes of the base station antennas.
Figure 4:
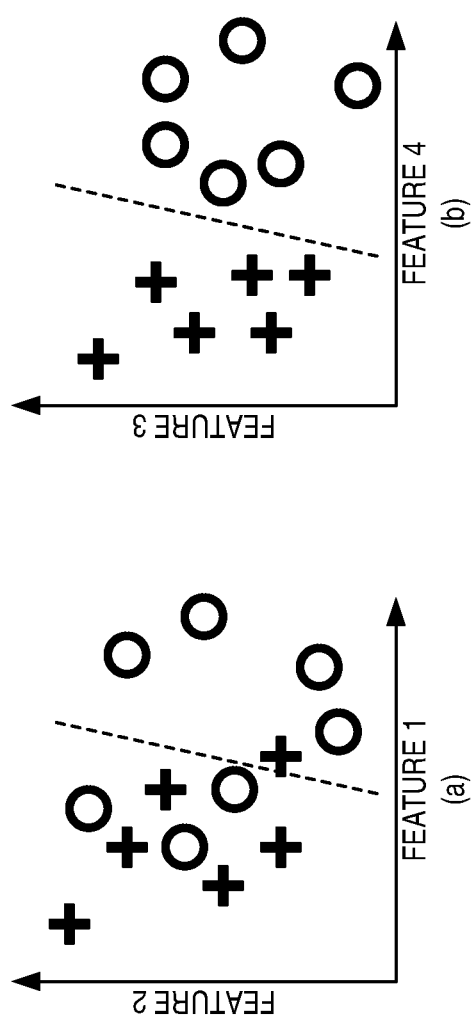
FIG. 4 shows an example of one type of machine learning.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

The problems and solutions of the present disclosure are described within the context of LTE, i.e. Evolved Universal Terrestrial Radio Access Network (E-UTRAN). It should be understood that the problems and solutions described herein are equally applicable to wireless access networks and UEs implementing other access technologies and standards. LTE is used as an example technology where the present disclosure is suitable, and using LTE in the description therefore is particularly useful for understanding the problem and solutions solving the problem.

There currently exist certain challenge(s) in relation to detection of flying UEs and, more specifically, to detection of "rogue" flying UEs, which are also referred to herein as "rogue drone UEs" or "rogue drones" or "unlicensed drone UEs". In traditional drone detection, the network evaluates the drone detector for every UE, thus requiring the detection procedure (collecting measurements and executing the classifier) to be run unnecessarily often. To enable accurate detection, i.e. find a few UEs that are "rogue" drones, the network needs to collect lots of data for each UE. In this regard, the following problems are faced:

Measurements collected at multiple serving nodes need to be signaled efficiently to a central node; and Accurate detection to reduce the risk of classifying a regular UE as a "rogue" drone UE.

Certain aspects of the present disclosure and their embodiments may provide solutions to the aforementioned or other challenges. The present disclosure describes a framework for enabling drone detection. The solution provides efficient signaling between a server (e.g., MME) and a network node (e.g., eNB, gNB), and methods for detecting "rogue" drone UEs at the server given the reports from the network nodes.

The present disclosure discloses a method to report drone measurements to a central node (denoted server) for accurate drone detection. The server collects and aggregates the data, either with simplistic aggregation functions, such as counters, or via a joint machine learning model that uses reported measurements from the network nodes and performs the drone classification centrally.

Certain embodiments may provide one or more of the following technical advantage(s). The advantages of the proposed disclosure can be summarized as follows:
  The predictions from multiple sessions can be combined at the central node leading to improved unlicensed drone detection.
  A triggering condition from central node leads to efficient signaling, avoiding large overhead in continuous reporting from the network nodes.
  Having the machine learning execution at the network nodes and reporting the output (e.g., probabilities) reduces the signaling overhead in comparison when having the machine learning in the server. When having the machine learning deployed in the server, it requires continuously receiving features from the network nodes.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The present disclosure describes a framework for enabling drone detection. The solution provides efficient signaling between a server (e.g., a core network node such as a MME) and a network node (e.g., a radio access node such as an eNB, gNB), and methods for detecting "rogue" drones at the server given the reports from the network nodes.

The present disclosure discloses a method to report drone measurements to a central node (denoted herein as a "server") for accurate drone detection. The server collects and aggregates the data, either with simplistic aggregation functions, such as counters, or via a joint machine learning model that uses reported measurements from the network nodes and performs the drone classification centrally.

The solution combines measurements from multiple UE sessions. A session can for example correspond to the time connected to one node before handover or going into idle mode. The solution details two nodes in the network, one network node serving UEs (e.g., eNB, gNB), and one server node (e.g., an MME or a separate logical entity) that handles the drone detection. The elements of the present disclosure are further described below.

Figure 5:
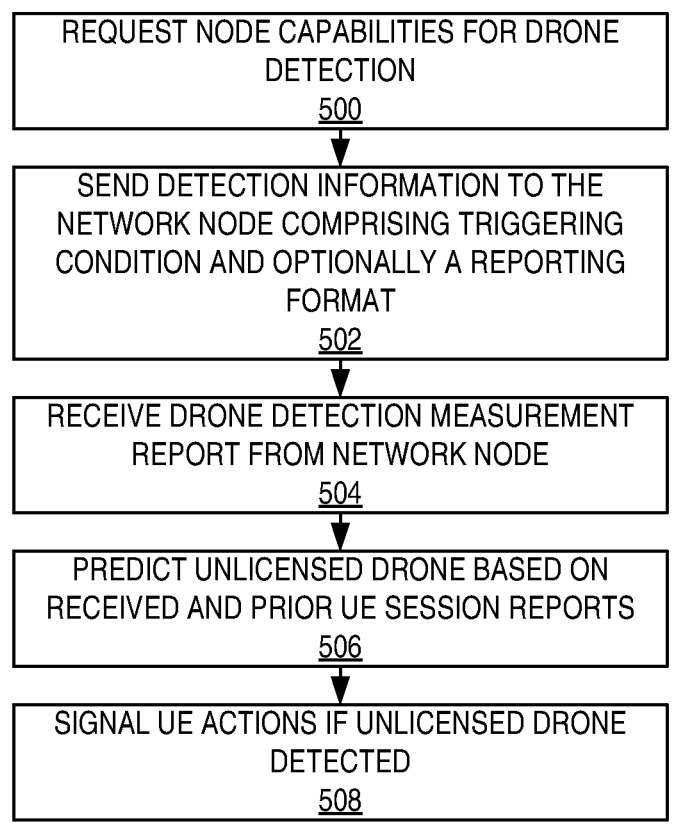
FIG. 5 is a flow chart that illustrates the operation of a server to provide unlicensed drone UE detection in accordance with embodiments of the present disclosure.
Figure 6:
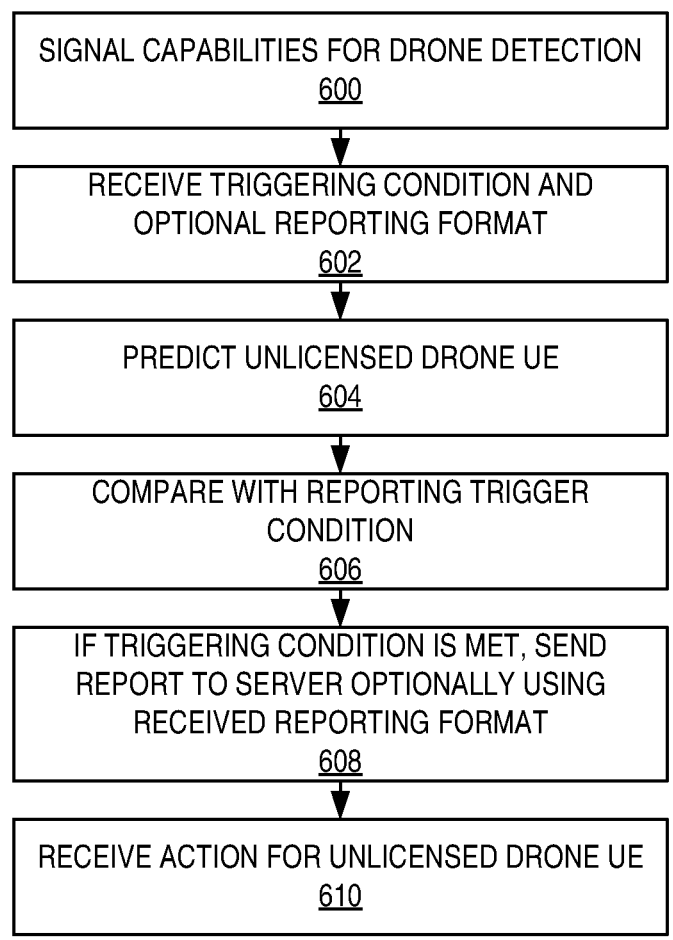
FIG. 6 is a flow chart that illustrates the operation of a network node to provide unlicensed drone UE detection in accordance with embodiments of the present disclosure.

One example of the method performed at the server is shown in FIG. 5. One example of the method performed at the network node is shown in FIG. 6.

As illustrated in FIG. 5, the server requests node capabilities for drone detection and receives a corresponding response (step 500). More specifically, the server can request the network node capabilities in detecting an unlicensed drone. In some embodiments, this request is sent to the network node either directly from the server or via one or more intermediate nodes. The response from the network node can for example comprise any one or more of the following:
  Information that indicates whether the network node supports drone detection In some embodiments, if the network node supports drone detection, this information is or may include an indication of a machine learning model used by the network node for drone detection. Note that there are many different types of machine learning models (e.g., decision tree, linear regression, random forest, etc.). Thus, different network nodes may use different machine learning models. This indication indicates the machine learning model used by the network node.

Assuming that the network node does support drone detection, the response from the network node may further include one or more of the following:
  Information that indicates a machine learning prediction performance or performance in detecting rogue drones in prior sessions. For example, the machine learning prediction performance may be expressed as a confidence value in the predictions made by the machine learning model.
  Information that indicates one or more features used in the machine learning model.
  Information that indicates a prediction periodicity, i.e., how often the detection probabilities are estimated.

The server node sends detection information to the network node(s), where the detection information comprises a triggering condition(s) and optionally a reporting format (step 502). In some embodiments, based on the received capabilities in step 500, the network (e.g., the server node) can select how to trigger a report from the network node to the server node.

In one embodiment, the triggering condition is:
  when the probability of an unlicensed drone is above a certain threshold, or
  when the probability is above a threshold for more than N prediction instances, or
  when the probability is above a threshold with a certain confidence.

The number N can be based on, e.g., the received capabilities from step 500, where a node with high confidence in its predicted probability can have a lower N compared with a node with lower confidence in the predictions. In another embodiment, the probability can be a filtered value, for example the moving average of predicted probabilities.

Another triggering condition could be to report when the UE performs a handover to another node. Then, the network node reports the predictions for the UE during its connected time. Another triggering condition could be based on when the UE goes into idle mode. The network node then reports the predictions during the UE's connected session. Another triggering condition could be based on a timer. For example, upon expiration of the timer or satisfying the above two conditions, the network node sends the measurement reports to the server.

The server might configure multiple network nodes for the identification of one drone UE, in which one triggering condition is configured per one cell. Note that one network node might control multiple cells. Only serving cells are configured with UE-based measurements, like Reference Signal Received Power (RSRP), Reference Signal Received Quality (RSRQ), while other cells are configured to overhear the UE's uplink transmission (e.g., Physical Random Access Channel (PRACH), Physical Uplink Shared Channel (PUSCH), and/or Physical Uplink Control Channel (PUCCH)) or Sounding Reference Signal (SRS).

The server node receives a drone detection measurement report(s) from the network node(s) (step 504). For a particular drone detection measurement report, the drone detection measurement report from the network node could be an indication that the detection is above a threshold received from the server node, or multiple probabilities with associated time stamps. The one or more probabilities could also include a confidence of the estimated rogue drone probability. The confidence could also be estimated implicitly at the server, where in case of multiple measurements indicating the same probability, the confidence is higher compared with when the set of probabilities is highly varying. The probabilities could also be reported as statistics, for example represented by a mean and variance. Note that the server node may provide the reporting format to the network node in step 502.

The server node predicts an unlicensed drone UE (i.e., makes a prediction that the UE is an unlicensed drone UE, i.e. a "rogue" drone UE) based on the received drone detection measurement report(s) from step 504 and, in some embodiments, prior drone detection measurement reports (step 506). The details of this prediction depend on the machine learning model used at the server node. This machine learning model may be, e.g., a decision tree, a linear regression, a random forest, or some other type of machine learning model. More specifically, the server can, over time, receive multiple reports from the network nodes. In one embodiment, when the server has received that the UE is considered as a drone M number of times, then that UE is declared as a drone UE. In another embodiment, the server processes the received reports (e.g., taking into account detection result with confidence level) and outputs if the UE is a drone UE.

In another embodiment, when, e.g., the network node has no capabilities in drone detection, the server runs its own machine learning algorithm on the reports received at step 504 and decides if a UE is a drone UE. Thus, if a network node does not support drone detection, then the detection information sent by the server to the network node in step 502 may include information that configures the network node to send a measurement report(s) and a triggering condition(s) for sending the measurement report(s) to the server. In this case, neither the measurement report nor the triggering condition(s) are related to a prediction by the network node that a UE is a drone UE. Rather, the reported measurements in this case are any measurements that can be used as input to a machine learning model used by the server for drone detection at the server. For example, the measurement reports from the network node in step 504 might comprise radio measurements such as RSRP, RSRQ, and Received Signal Strength Indicator (RSSI). The server can run a single algorithm on the received measurements or multiple algorithms segregating the reports based on their cells. Along with the embodiments, the server can request traffic statistics of a probable drone UE from the network (e.g., from the network node(s)). The traffic statistics can be generated from eNBs by aggregating total received/transmitted uplink/downlink packets for the UE under consideration. Alternatively, traffic statistics can also be generated from the Evolved Packet Core (EPC) by observing Packet Data Network (PDN) connection. Besides traffic statistics, the server can further take into account past knowledge such as mobility/handover/position history of the UE.

Probabilities from the machine learning algorithm output and traffic statistics and mobility/handover/position history can be combined to take a more concrete decision regarding classification of the UE.

Once the server node has detected an unlicensed drone UE, the server node signals one or more actions to be taken with respect to the detected unlicensed drone UE (step 508).

More specifically, if the server labels a UE as an unlicensed flying drone UE, it may transmit a "disconnect UE" request to the network node serving the UE. In another embodiment, the server informs the network node about a possible unlicensed UE and leaves the action decision to the network node. The information sent to the network node can consist of a measure indicating the probability of a UE being an unlicensed drone. In another embodiment, the server reports the detection result to a drone traffic management system. In another embodiment, the server reports the detection result to an external trusted party such as law enforcement entity.

It should be noted that while FIG. 5 illustrates a number of "steps," not all steps may be necessary. For example, in some embodiments, all network nodes may have the drone detection capabilities or these capabilities may already be known to the server, in which case step 500 may not need to be performed. Similarly, in some embodiments, step 502 may not be needed (e.g., the triggering condition(s) and optionally reporting format are already known to the network node(s) (e.g., predefined)).

As illustrated in FIG. 6, the network node signals capabilities for drone detection, e.g., to a server (step 600). In some embodiments, the server can request the network node capabilities in detecting an unlicensed drone. In some embodiments, this request is sent to the network node either directly from the server or via one or more intermediate nodes. In this case, the signaling of the capabilities of the network node for drone detection is signaled in response to the request.

The signaling of the drone detection capabilities can for example comprise any one or more of the following:
  Information that indicates whether the network node supports drone detection
    In some embodiments, if the network node supports drone detection, this information is or may include an indication of a machine learning model used by the network node for drone detection.
  Assuming that the network node does support drone detection, the response from the network node may further include one or more of the following:
    Information that indicates a machine learning prediction performance or performance in detecting rogue drones in prior sessions. For example, the machine learning prediction performance may be expressed as a confidence value in the predictions made by the machine learning model.
    Information that indicates one or more features used in the machine learning model.
    Information that indicates a prediction periodicity, i.e., how often the detection probabilities are estimated.

The network node also receives detection information from the server node, where the detection information comprises a triggering condition(s) and optionally a reporting format (step 602). In some embodiments, based on the capabilities signaled in step 600, the network (e.g., the server node) can select how to trigger a report from the network node to the server node.
  In one embodiment, the triggering condition is:
  when the probability of an unlicensed drone is above a certain threshold, or
  when the probability is above a threshold for more than N prediction instances, or
  when the probability is above a threshold with a certain confidence.

The number N can be based on, e.g., the received capabilities from step 600, where a node with high confidence in its predicted probability can have a lower N compared with a node with lower confidence in the predictions. In another embodiment, the probability can be a filtered value, for example the moving average of predicted probabilities.

Another triggering condition could be to report when the UE performs a handover to another node. Then, the network node reports the predictions for said UE during its connected time. Another triggering condition could be based on when the UE goes into idle mode. The network node then reports the predictions during its connected session. Another triggering condition could be based on a timer. For example, upon expiration of the timer or satisfying the above two conditions, the network node sends the measurement reports to the server.

The server might configure multiple network nodes for the identification of one drone UE, in which one triggering condition is configured per one cell (note one network node might control multiple cells). Only serving cells are configured with UE-based measurements, like RSRP and RSRQ, while other cells are configured to overhear UE's uplink transmission (PRACH/PUSCH/PUCCH) or SRS.

In this example, the network node has drone detection capabilities. As such, the network node performs unlicensed drone UE prediction (step 604). The network node can perform drone detection using its own machine learning algorithm based on its capability and available input(s).

The network node compares a result of the unlicensed drone UE prediction with the triggering condition(s) for the drone detection measurement report (step 606). If the triggering condition is met, the network node sends a drone detection measurement report to the server node optionally using the received reporting format (step 608).

The drone detection measurement report from the network node could be an indication that the probability of detection of an unlicensed drone UE is above a threshold (e.g., a threshold received from the server node), or multiple probabilities with associated time stamps. The one or more probabilities could also include a confidence of the estimated rogue drone probability. The confidence could also be estimated implicitly at the server, where in case of multiple measurements indicating the same probability, the confidence is higher compared with when the set of probabilities is highly varying. The probabilities could also be reported as statistics, for example represented by a mean and variance. Note that the network node may receive the reporting format from the server in step 602.

In another embodiment, when, e.g., the network node has no capabilities in drone detection, the server runs its own machine learning algorithm on reports from network node including that report from the network node sent in step 608 and decides if a UE is a drone UE. Thus, if the network node does not support drone detection, then the information received from the server in step 602 may include information that configures the network node to send a measurement report(s) and a triggering condition(s) for sending the measurement report(s) to the server. In this case, neither the measurement report nor the triggering condition(s) are related to a prediction by the network node that a UE is a drone UE. Rather, the reported measurements in this case are any measurements that can be used as input to a machine learning model used by the server for drone detection at the server. For example, if the network node does not support drone detection, then, in step 604, the network node obtains (e.g., makes) the desired measurements, where these measurements may include, e.g., radio measurements such as RSRP, RSRQ, and RSSI. These measurements are then used for the measurement report. Along with the embodiments, the server can request traffic statistics of a probable drone UE from the network (e.g., from the network node(s)). The traffic statistics can be generated from eNBs by aggregating total received/transmitted uplink/downlink packets for the UE under consideration. Alternatively, traffic statistics can also be generated from the EPC by observing PDN connection. Besides traffic statistics, the server can further take into account past knowledge such as mobility/handover/position history of the UE.

Probabilities from the machine learning algorithm output and traffic statistics and mobility/handover/position history can be combined to take a more concrete decision regarding classification of the UE.

If the server node has detected an unlicensed drone UE, the server node signals and the network node receives one or more actions to be taken with respect to the detected unlicensed drone UE (step 610). More specifically, if the server labels a UE as an unlicensed flying drone UE, it may transmit a "disconnect UE" request to the network node serving the UE.

In another embodiment, the server informs the network node about a possible unlicensed UE and leaves the action decision to the network node. The information sent to the network node can consist of a measure indicating the probability of a UE being an unlicensed drone. In another embodiment, the server reports the detection result to a drone traffic management system. In another embodiment, the server reports the detection result to an external trusted party such as law enforcement entity.

It should be noted that while FIG. 6 illustrates a number of "steps," not all steps may be necessary. For example, in some embodiments, all network nodes may have the drone detection capabilities or these capabilities may already be known to the server, in which case step 600 may not need to be performed. Similarly, in some embodiments, step 602 may not be needed (e.g., the triggering condition(s) and optionally reporting format are already known to the network node(s) (e.g., predefined)).

Figure 7:
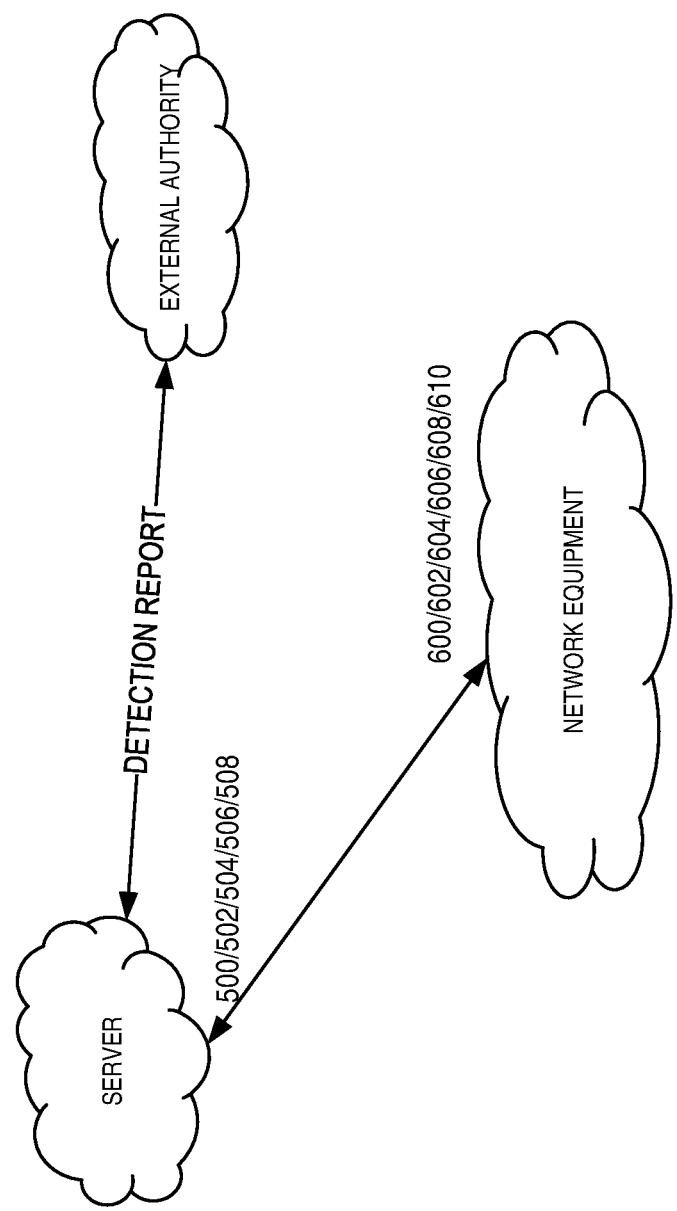
FIG. 7 illustrates a system architecture for embodiments of the present disclosure.

An example system architecture utilized for embodiments of the present disclosure is depicted in FIG. 7. FIG. 7 shows the server, the network node (denoted "network equipment"), and a separate entity (denoted "external authority"). The separate entity can obtain the aforementioned receive drone detection information from the server node.

Figure 8:
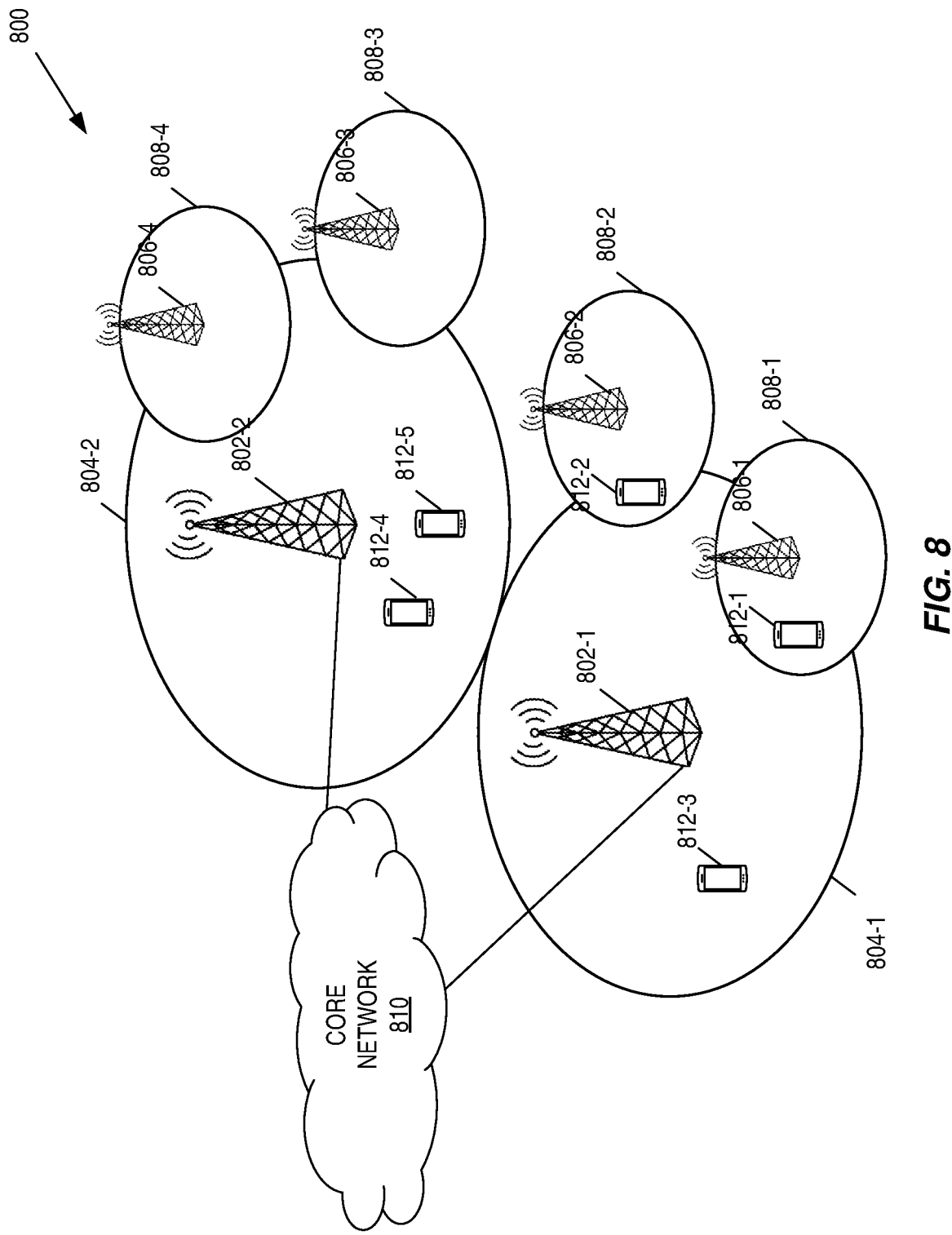
FIG. 8 illustrates one example of a cellular communications network in which embodiments of the present disclosure may be implemented.

FIG. 8 illustrates one example of a cellular communications network 800 in which embodiments of the present disclosure may be implemented. In the embodiments described herein, the cellular communications network 800 is a LTE or 5G NR network. In this example, the cellular communications network 800 includes base stations 802-1 and 802-2, which in LTE are referred to as eNBs and in 5G NR are referred to as gNBs, controlling corresponding macro cells 804-1 and 804-2. The base stations 802-1 and 802-2 are generally referred to herein collectively as base stations 802 and individually as base station 802. Likewise, the macro cells 804-1 and 804-2 are generally referred to herein collectively as macro cells 804 and individually as macro cell 804. The cellular communications network 800 may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806.

Likewise, the small cells 808-1 through 808-4 are generally referred to herein collectively as small cells 808 and individually as small cell 808. The base stations 802 (and optionally the low power nodes 806) are connected to a core network 810.

The base stations 802 and the low power nodes 806 provide service to wireless devices 812-1 through 812-5 in the corresponding cells 804 and 808. The wireless devices 812-1 through 812-5 are generally referred to herein collectively as wireless devices 812 and individually as wireless device 812. The wireless devices 812 are also sometimes referred to herein as UEs.

In some embodiments, the "server" (or "server node") described above is implemented in a core network node in the core network 810, and the "network node" described above is a radio access node such as the base station 802 or low power node 806. As such, the functionality described herein as being performed by a server or server node is, in some embodiments, provided by a core network node (e.g., a MME), and the functionality described herein as being performed by a network node is, in some embodiments, provided by a radio access node such as, e.g., the base station 802 or low power node 806.

Figure 9:
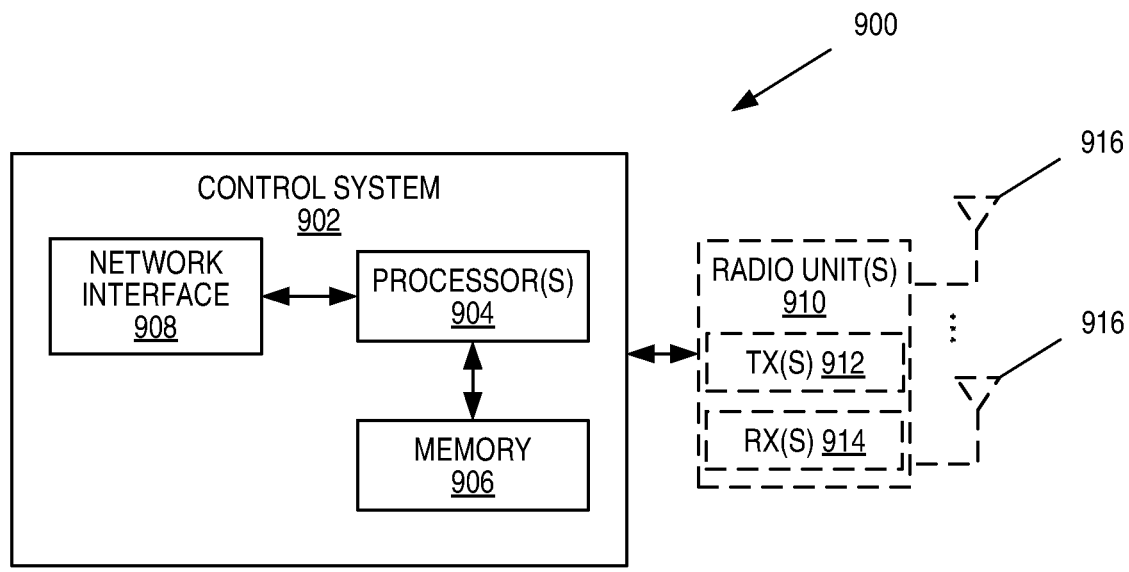

FIG. 9 is a schematic block diagram of a node 900 according to some embodiments of the present disclosure. In some embodiments, the node 900 is a core network node. In some other embodiments, the node 900 is a radio access node such as, e.g., a base station 802 or low power node 806. As illustrated, the node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, if the node 900 is a radio access node, the node 900 also includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a node 900 (i.e., the functions of a server or the functions of a network node) as described herein. In some embodiments, the function(s) are implemented in software that is stored, e.g., in the memory 906 and executed by the one or more processors 904.

FIG. 10 is a schematic block diagram that illustrates a virtualized embodiment of the node 900 according to some embodiments of the present disclosure. As used herein, a "virtualized" node is an implementation of the node 900 in which at least a portion of the functionality of the node 900 is implemented as a virtual component(s) (e.g., via a virtual machine(s) executing on a physical processing node(s) in a network(s)). As illustrated, in this example, the virtualized node 900 includes one or more processing nodes 1000 coupled to or included as part of a network(s) 1002. Each processing node 1000 includes one or more processors 1004 (e.g., CPUs, ASICs, FPGAs, and/or the like), memory 1006, and a network interface 1008. Optionally, if, e.g., the node 900 is a radio access node, the node 900 also includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to the processing node(s) 1000 via the network 1002.

In this example, functions 1010 of the node 900 described herein are implemented at the one or more processing nodes 1000 or distributed across the control system 902 and the one or more processing nodes 1000 in any desired manner. In some particular embodiments, some or all of the functions 1010 of the node 900 described herein are implemented as virtual components executed by, e.g., one or more virtual machines implemented in a virtual environment(s) hosted by the processing node(s) 1000. As will be appreciated by one of ordinary skill in the art, if the node 900 is a radio access node, additional signaling or communication between the processing node(s) 1000 and the control system 902 is used in order to carry out at least some of the desired functions 1010. Notably, in some embodiments in which the node 900 is a radio access node, the control system 902 may not be included, in which case the radio unit(s) 910 communicate directly with the processing node(s) 1000 via an appropriate network interface(s).

In other words, in some embodiments, the processing nodes 1000 form a physical infrastructure on which one or more virtual nodes are implemented. A virtual node may be virtual node implementation of a core network node or a virtual node implementation of at least a part of the functionality of a radio access node. Thus, in some embodiments, the "server" or "server node" described herein may be a virtual core network node (e.g., a virtual MME). Similarly, in some embodiments, the "network node" described herein may be at least partially implemented as a virtual node (e.g., a radio access node that provides the functionality of the network node described herein may be implemented as a combination of a virtual node (e.g., a virtual node hosted by the processing node(s) 1000) and a physical node (e.g., a physical node comprising the radio unit(s) 910)).

In some embodiments, a computer program including instructions which, when executed by at least one processor, causes the at least one processor to carry out the functionality of the node 900 or a node (e.g., a processing node 1000) implementing one or more of the functions 1010 of the node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
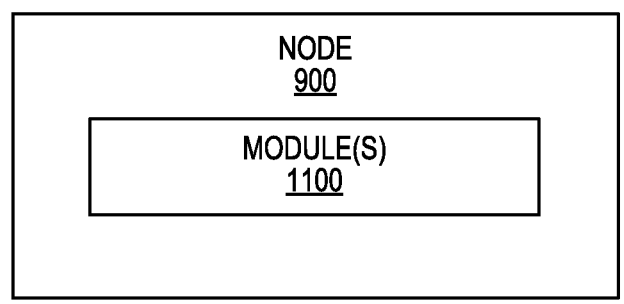

FIG. 11 is a schematic block diagram of the node 900 according to some other embodiments of the present disclosure. The node 900 includes one or more modules 1100, each of which is implemented in software. The module(s) 1100 provide the functionality of the node 900 (e.g., the functionality of the server or server node or the functionality of the network node) described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
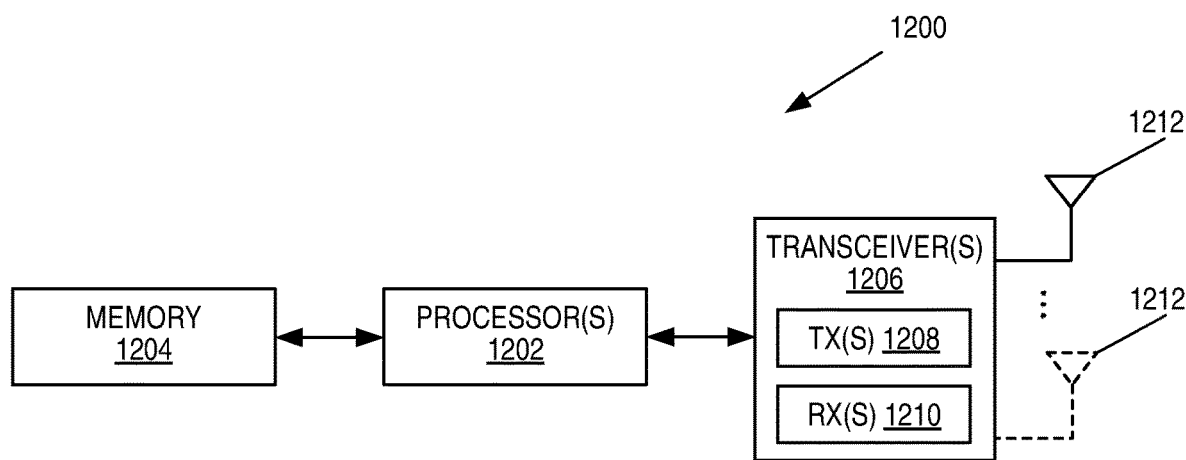
FIGS. 12 and 13 are block diagrams of example embodiments of a UE.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
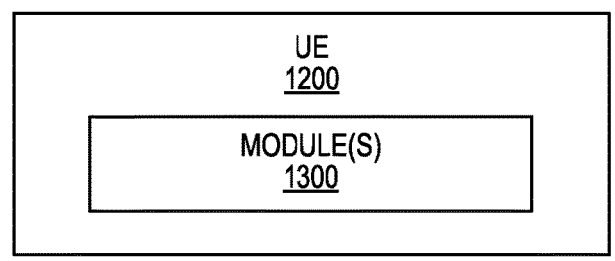

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments disclosed herein include the following:

Embodiment 1: A method of operation of a server for providing unlicensed drone User Equipment device, UE, detection in a cellular communications network, comprising: receiving (504), from a network node, a measurement report for a UE session of a UE; predicting (506) that the UE is an unlicensed drone UE based on the measurement report for the UE session and one or more prior measurement reports received by the server for one or more prior UE sessions of the UE; and taking one or more actions upon predicting that the UE is an unlicensed drone UE.

Embodiment 2: The method of embodiment 1 wherein taking one or more actions comprises signaling (508), to another node, one or more actions to be taken with respect to the UE.

Embodiment 3: The method of embodiment 2 wherein the other node is the network node from which the measurement report was received.

Embodiment 4: The method of any one of embodiments 1 to 3 further comprising, prior to receiving (504) the measurement report from the network node, sending (502) detection information to the network node, the detection information comprising a triggering condition for the measurement report.

Embodiment 5: The method of embodiment 4 wherein the triggering condition is when a probability of the UE being an unlicensed drone UE, as determined by the network node, is above a defined threshold.

Embodiment 6: The method of embodiment 4 wherein the triggering condition is when a probability of the UE being an unlicensed drone UE, as determined by the network node, is above a defined threshold for at least N prediction instances.

Embodiment 7: The method of embodiment 6 wherein N is greater than 1.

Embodiment 8: The method of embodiment 6 or 7 wherein a value of Nis comprised in the detection information.

Embodiment 9: The method of any one of embodiments 6 to 8 wherein Nis based on drone detection capabilities of the network node.

Embodiment 10: The method of embodiment 4 wherein the triggering condition is when a probability of the UE being an unlicensed drone UE, as determined by the network node, is above a defined threshold with a defined confidence.

Embodiment 11: The method of embodiment 4 wherein the triggering condition is when the UE performs a handover to another network node.

Embodiment 12: The method of embodiment 4 wherein the triggering condition is when the UE goes into an IDLE mode.

Embodiment 13: The method of embodiment 4 wherein the triggering condition is based on a timer.

Embodiment 14: The method of any one of embodiments 4 to 13 wherein the detection information further comprises an indication of a reporting format to be used by the network node for the measurement report.

Embodiment 15: The method of any one of embodiments 1 to 14 further comprising, prior to receiving (504) the measurement report from the network node, requesting (500) one or more drone detection capabilities of the network node.

Embodiment 16: The method of embodiment 15 wherein the one or more drone detection capabilities of the network node comprise: whether the network node supports drone detection; a machine learning model used by the network node for drone detection; a prediction performance of a machine learning model used by the network node; information regarding a performance of the machine learning model used by the network node to detect unlicensed drones in prior sessions; one or more features used by the machine learning model used by the network node for drone detection; and/or a prediction periodicity of the machine learning model used by the network node to detect unlicensed drones.

Embodiment 17: The method of any one of embodiments 1 to 16 wherein predicting (506) that the UE is an unlicensed drone UE based on the measurement report for the UE session and one or more prior measurement reports received by the server for one or more prior UE sessions of the UE comprises: predicting (506) that the UE is an unlicensed drone UE based on a number of times that the UE has been predicted, in the measurement reports, as being an unlicensed drone UE and/or a confidence level of the predictions in the measurement reports that the UE is an unlicensed drone UE.

Embodiment 18: The method of any one of embodiments 1 to 17 wherein the measurement report comprises information that indicates that the network node has predicted that the UE is an unlicensed drone UE.

Embodiment 19: The method of embodiment 18 wherein the measurement report further comprises a confidence level for the prediction that the UE is an unlicensed drone UE.

Embodiment 20: The method of any one of embodiments 1 to 17 wherein the measurement report comprises a confidence level that the UE is an unlicensed drone UE.

Embodiment 21: A node that implements a server for providing unlicensed drone User Equipment device, UE, detection in a cellular communications network, the server adapted to perform the method of any one of embodiments 1 to 20.

Embodiment 22: A method of operation of a network node for providing unlicensed drone User Equipment device, UE, detection in a cellular communications network, comprising: sending (608), to a server, a measurement report for a UE session of a UE, the measurement report comprising information that relates to whether the UE is an unlicensed drone UE.

Embodiment 23: The method of embodiment 22 further comprising receiving, from the server, signaling that indicates that the UE is an unlicensed drone UE.

Embodiment 24: The method of embodiment 23 wherein the signaling comprises an indication of one or more actions to be taken with respect to the UE.

Embodiment 25: The method of any one of embodiments 22 to 24 further comprising, prior to sending (608) the measurement report to the server, receiving (602) detection information from the server, the detection information comprising a triggering condition for the measurement report.

Embodiment 26: The method of embodiment 25 wherein the triggering condition is when a probability of the UE being an unlicensed drone UE, as determined by the network node, is above a defined threshold.

Embodiment 27: The method of embodiment 25 wherein the triggering condition is when a probability of the UE being an unlicensed drone UE, as determined by the network node, is above a defined threshold for at least N prediction instances.

Embodiment 28: The method of embodiment 27 wherein N is greater than 1.

Embodiment 29: The method of embodiment 27 or 28 wherein a value of N is comprised in the detection information.

Embodiment 30: The method of any one of embodiments 27 to 29 wherein Nis based on drone detection capabilities of the network node.

Embodiment 31: The method of embodiment 25 wherein the triggering condition is when a probability of the UE being an unlicensed drone UE, as determined by the network node, is above a defined threshold with a defined confidence.

Embodiment 32: The method of embodiment 25 wherein the triggering condition is when the UE performs a handover to another network node.

Embodiment 33: The method of embodiment 25 wherein the triggering condition is when the UE goes into an IDLE mode.

Embodiment 34: The method of embodiment 25 wherein the triggering condition is based on a timer.

Embodiment 35: The method of any one of embodiments 25 to 34 wherein the detection information further comprises an indication of a reporting format to be used by the network node for the measurement report.

Embodiment 36: The method of any one of embodiments 25 to 35 further comprising: determining (606) whether the triggering condition is met; wherein sending (608) the measurement report comprises sending the measurement report to the server upon determining that the triggering condition is met.

Embodiment 37: The method of embodiment 36 further comprising: performing (604) an unlicensed drone detection procedure directed at the UE; wherein determining (606) whether the triggering condition is met comprises comparing a result of the unlicensed drone detection procedure with the triggering condition.

Embodiment 38: The method of any one of embodiments 22 to 37 further comprising, prior to sending (608) the measurement report to the server, signaling (600) one or more drone detection capabilities of the network node to the server.

Embodiment 39: The method of embodiment 38 wherein the one or more drone detection capabilities of the network node comprise: whether the network node supports drone detection; a machine learning model used by the network node for drone detection; a prediction performance of a machine learning model used by the network node; information regarding a performance of the machine learning model used by the network node to detect unlicensed drones in prior sessions; one or more features used by the machine learning model used by the network node for drone detection; and/or a prediction periodicity of the machine learning model used by the network node to detect unlicensed drones.

Embodiment 40: The method of any one of embodiments 22 to 39 wherein the measurement report comprises information that indicates that the network node has predicted that the UE is an unlicensed drone UE.

Embodiment 41: The method of embodiment 40 wherein the measurement report further comprises a confidence level for the prediction that the UE is an unlicensed drone UE.

Embodiment 42: The method of any one of embodiments 22 to 39 wherein the measurement report comprises a confidence level that the UE is an unlicensed drone UE.

Embodiment 43: A network node for providing unlicensed drone User Equipment device, UE, detection in a cellular communications network, the network node adapted to perform the method of any one of embodiments 22 to 42.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
    5G Fifth Generation
    ASIC Application Specific Integrated Circuit
    CPU Central Processing Unit
    DSP Digital Signal Processor
    eNB Enhanced or Evolved Node B
    EPC Evolved Packet Core
    E-UTRAN Evolved Universal Terrestrial Radio Access Network
    FPGA Field Programmable Gate Array
    gNB New Radio Base Station
    IoT Internet of Things
    LTE Long Term Evolution
    m Meter
    MME Mobility Management Entity
    MTC Machine Type Communication
    NR New Radio PDN Packet Data Network
P-GW Packet Data Network Gateway
PRACH Physical Random Access Channel
PUCCH Physical Uplink Control Channel
PUSCH Physical Uplink Shared Channel
RAM Random Access Memory
RAN Radio Access Network
ROM Read Only Memory
RRH Remote Radio Head
RSRP Reference Signal Received Power
RSRQ Reference Signal Received Quality
RSSI Received Signal Strength Indicator
SI System Information
SIM Subscriber Identity Module
SIR Signal to Interference Ratio
SRS Sounding Reference Signal
TR Technical Report
UE User Equipment
WG1 Work Group 1
WG2 Work Group 2

Those skilled in the art will recognize improvements and modifications to the embodiments of the present disclosure. All such improvements and modifications are considered within the scope of the concepts disclosed herein.

REFERENCES

[1] NTT DOCOMO INC, et al., "RP-170779: New SID on Enhanced Support for Aerial Vehicles" 3GPP TSG RAN Meeting #75, Mar. 6-9, 2017, Dubrovnik, Croatia.
[2] "Technical Specification Group Radio Access Network; Study on Enhanced LTE Support for Aerial Vehicles (Release 15)," Technical Report 36.777, 3GPP Organizational Partners, December 2017.
[3] Ericsson, "RP-172826: WID on Enhanced LTE Support for Aerial Vehicles," 3GPP TSG RAN Meeting #78, Dec. 18-21, 2017, Lisbon, Portugal.

What is claimed is:

1. A method of operation of a server for providing unlicensed drone User Equipment device (UE) detection in a cellular communications network, comprising:
receiving, from a network node, a measurement report for a UE;
predicting that the UE is an unlicensed drone UE based on the measurement report for the UE; and
taking one or more actions upon predicting that the UE is an unlicensed drone UE,
wherein predicting comprises predicting that the UE is an unlicensed drone UE based on the measurement report for the UE and one or more prior measurement reports received by the server for the UE, and
wherein the measurement report for the UE is a measurement report for a UE session of the UE, and the one or more prior measurement reports are one or more prior measurement reports received by the server for one or more prior UE sessions of the UE, and
wherein the measurement report and the one or more prior measurement reports are for two or more different cells, and
wherein at least one of the one or more prior measurement reports is received by the server from another network node.

2. The method of claim 1, wherein the measurement report is a measurement report for a UE session of the UE.

3. The method of claim 1, wherein predicting that the UE is an unlicensed drone UE comprises:
predicting that the UE is an unlicensed drone UE based on:
a number of times that the UE has been predicted, in the measurement report and the one or more prior measurement reports, as being an unlicensed drone UE; and/or
a confidence level of the predictions in the measurement report and the one or more prior measurement reports that the UE is an unlicensed drone UE.

4. The method of claim 1, wherein the measurement report comprises one or more measurements for the UE that can be used by the server when predicting that the UE is an unlicensed drone UE.

5. The method of claim 1, wherein taking one or more actions comprises signaling, to another node, one or more actions to be taken with respect to the UE, and wherein the other node is the network node from which the measurement report was received.

6. The method of claim 1, further comprising, prior to receiving the measurement report from the network node, requesting and receiving one or more drone detection capabilities of the network node, and sending detection information to the network node, the detection information comprising a triggering condition for the measurement report, and wherein the triggering condition is:
when a probability of the UE being an unlicensed drone UE, as determined by the network node, is above a defined threshold;
when a probability of the UE being an unlicensed drone UE, as determined by the network node, is above a defined threshold for at least N prediction instances;
when a probability of the UE being an unlicensed drone UE, as determined by the network node, is above a defined threshold with a confidence that is above a defined confidence threshold;
when the UE performs a handover to another network node;
when the UE goes into an IDLE mode; or
based on a timer, and
wherein the triggering condition is when a probability of the UE being an unlicensed drone UE, as determined by the network node, is above a defined threshold for at least N prediction instances, and N is greater than 1.

7. The method of claim 6, wherein the triggering condition is when a probability of the UE being an unlicensed drone UE, as determined by the network node, is above a defined threshold for at least N prediction instances, and a value of N is comprised in the detection information, or N is based on drone detection capabilities of the network node, and wherein the detection information further comprises an indication of a reporting format to be used by the network node for the measurement report.

8. The method of claim 6, wherein the one or more drone detection capabilities of the network node comprise:
whether the network node supports drone detection;
a machine learning model used by the network node for drone detection;
a prediction performance of a machine learning model used by the network node;
information regarding a performance of the machine learning model used by the network node to detect unlicensed drones in prior sessions;
one or more features used by the machine learning model used by the network node for drone detection; and/or
a prediction periodicity of the machine learning model used by the network node to detect unlicensed drones.

9. The method of claim 3, wherein the measurement report comprises information that indicates that the network node has predicted that the UE is an unlicensed drone UE; and/or a confidence level for the prediction that the UE is the unlicensed drone UE.

10. A node for implementing a server for providing unlicensed drone User Equipment device (UE) detection in a cellular communications network, wherein, in order to implement the server, the node is adapted to:
  receive, from a network node, a measurement report for a UE;
  predict that the UE is an unlicensed drone UE based on the measurement report for the UE; and
  take one or more actions upon predicting that the UE is an unlicensed drone UE, wherein the node is adapted to predict that the UE is an unlicensed drone UE based on the measurement report for the UE comprises predicting that the UE is an unlicensed drone UE based on the measurement report for the UE and one or more prior measurement reports received by the server for the UE, and
  wherein the measurement report for the UE is a measurement report for a UE session of the UE, and the one or more prior measurement reports are one or more prior measurement reports received by the server for one or more prior UE sessions of the UE, and
  wherein the measurement report and the one or more prior measurement reports are for two or more different cells, and
  wherein at least one of the one or more prior measurement reports is received by the server from another network node.

11. A method of operation of a network node for providing unlicensed drone User Equipment (UE) device detection in a cellular communications network, comprising:
  sending, to a server, a measurement report for a UE, the measurement report comprising:
    information that relates to whether the UE is an unlicensed drone UE, and
    prior to sending the measurement report:
      performing an unlicensed drone detection procedure directed at the UE to thereby determine a prediction as to whether the UE is an unlicensed drone UE and/or a confidence level for the prediction that the UE is an unlicensed drone UE;
    wherein the measurement report comprises information that indicates the prediction as to whether the UE is an unlicensed drone UE and/or information that indicates the confidence level for the prediction that the UE is an unlicensed drone UE, and/or
    wherein the measurement report comprises one or more measurements for the UE that relate to whether the UE is an unlicensed drone UE, and
    wherein the measurement report is a measurement report for a UE session of the UE.

12. The method of claim 11, further comprising:
  receiving, from the server, signaling that indicates that the UE is an unlicensed drone UE, and
  wherein the signaling comprises an indication of one or more actions to be taken with respect to the UE.

13. The method of claim 11, further comprising, prior to sending the measurement report to the server:
  signaling one or more drone detection capabilities of the network node to the server, and
  receiving detection information from the server, the detection information comprising a triggering condition for the measurement report, and wherein the triggering condition is:
    when a probability of the UE being an unlicensed drone UE, as determined by the network node, is above a defined threshold;
    when a probability of the UE being an unlicensed drone UE, as determined by the network node, is above a defined threshold for at least N prediction instances;
    when a probability of the UE being an unlicensed drone UE, as determined by the network node, is above a defined threshold with a confidence that is above a defined confidence threshold;
    when the UE performs a handover to another network node;
    when the UE goes into an IDLE mode; or
    based on a timer.

14. The method of claim 13, wherein the triggering condition is when a probability of the UE being an unlicensed drone UE, as determined by the network node, is above a defined threshold for at least N prediction instances, and N is greater than 1.

15. The method of claim 13, wherein the triggering condition is when a probability of the UE being an unlicensed drone UE, as determined by the network node, is above a defined threshold for at least N prediction instances, and a value of N is comprised in the detection information, or N is based on drone detection capabilities of the network node.

16. The method of claim 13, wherein the detection information further comprises an indication of a reporting format to be used by the network node for the measurement report.

17. The method of claim 13, further comprising:
  determining whether the triggering condition is met;
  wherein sending the measurement report comprises sending the measurement report to the server upon determining that the triggering condition is met.

18. The method of claim 13, wherein the one or more drone detection capabilities of the network node comprise:
  whether the network node supports drone detection;
  a machine learning model used by the network node for drone detection;
  a prediction performance of a machine learning model used by the network node;
  information regarding a performance of the machine learning model used by the network node to detect unlicensed drones in prior sessions;
  one or more features used by the machine learning model used by the network node for drone detection; and/or
  a prediction periodicity of the machine learning model used by the network node to detect unlicensed drones.

19. A network node for providing unlicensed drone User Equipment device (UE) detection in a cellular communications network, the network node adapted to:
  send, to a server, a measurement report for a UE, the measurement report comprising:
    information that relates to whether the UE is an unlicensed drone UE, and
  prior to sending the measurement report, the network node is adapted to:
  perform an unlicensed drone detection procedure directed at the UE to thereby determine a prediction as to whether the UE is an unlicensed drone UE and/or a confidence level for the prediction that the UE is an unlicensed drone UE;

wherein the measurement report comprises information that indicates the prediction as to whether the UE is an unlicensed drone UE and/or information that indicates the confidence level for the prediction that the UE is an unlicensed drone UE, and/or wherein the measurement report comprises one or more measurements for the UE that relate to whether the UE is an unlicensed drone UE, and wherein the measurement report is a measurement report for a UE session of the UE.

* * * * *